United States Patent
Tang et al.

(10) Patent No.: US 10,972,362 B2
(45) Date of Patent: Apr. 6, 2021

(54) NETWORK SERVICE CONFIGURATION METHOD AND NETWORK MANAGEMENT DEVICE

(71) Applicant: Huawei Technologies Co., Ltd., Shenzhen (CN)

(72) Inventors: Xiaohu Tang, Nanjing (CN); Bin Yu, Nanjing (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 35 days.

(21) Appl. No.: 15/938,773

(22) Filed: Mar. 28, 2018

(65) Prior Publication Data

US 2018/0287889 A1 Oct. 4, 2018

(30) Foreign Application Priority Data

Mar. 28, 2017 (CN) .......................... 201710193791.8

(51) Int. Cl.
*H04L 12/24* (2006.01)
*H04L 12/46* (2006.01)
(Continued)

(52) U.S. Cl.
CPC .......... *H04L 41/50* (2013.01); *H04L 12/4641* (2013.01); *H04L 41/08* (2013.01);
(Continued)

(58) Field of Classification Search
CPC . H04L 61/2015; H04L 12/4641; H04L 49/35; H04L 41/12; H04L 49/70;
(Continued)

(56) References Cited

U.S. PATENT DOCUMENTS

| 7,640,359 B1 | 12/2009 | Gilmartin |
| 2004/0073600 A1* | 4/2004 | Elo ..................... H04L 41/0803 709/201 |

(Continued)

FOREIGN PATENT DOCUMENTS

| CN | 102984507 A | 3/2013 |
| EP | 2757743 A1 | 7/2014 |

(Continued)

OTHER PUBLICATIONS

Foreign Communication From a Counterpart Application, European Application No. 18164184.6, Extended European Search Report dated Jul. 11, 2018, 9 pages.

(Continued)

*Primary Examiner* — Asad M Nawaz
*Assistant Examiner* — Najeeb Ansari
(74) *Attorney, Agent, or Firm* — Conley Rose, P.C.

(57) ABSTRACT

A network service configuration method and a network management device, where the method includes obtaining, by a network management device, a terminal access port and an access parameter that is configured for the terminal access port and that is of a network service, determining a to-be-configured port according to the access parameter that is configured for the terminal access port and that is of the network service; generating a configuration instruction of the to-be-configured port, and sending the configuration instruction of the to-be-configured port to a to-be-configured network device. Hence, intervention from an administrator is not required, an error probability of network operation and maintenance may be reduced, efficiency of configuring a parameter of the network service is improved, and administrator time is saved.

20 Claims, 8 Drawing Sheets

(51) Int. Cl.
*H04L 29/06* (2006.01)
*H04L 12/933* (2013.01)
*H04L 29/12* (2006.01)

(52) U.S. Cl.
CPC ...... *H04L 41/0806* (2013.01); *H04L 41/0846* (2013.01); *H04L 41/0886* (2013.01); *H04L 41/12* (2013.01); *H04L 63/1425* (2013.01); *H04L 49/15* (2013.01); *H04L 61/2015* (2013.01)

(58) Field of Classification Search
CPC ....... H04L 45/00; H04L 49/15; H04L 45/586; H04L 45/66
See application file for complete search history.

(56) References Cited

U.S. PATENT DOCUMENTS

| | | | |
|---|---|---|---|
| 2005/0066036 A1 | 3/2005 | Gilmartin | |
| 2005/0114474 A1* | 5/2005 | Anderson | H04L 41/0806 709/220 |
| 2009/0049191 A1* | 2/2009 | Tolliver | H04L 41/0806 709/238 |
| 2009/0304008 A1* | 12/2009 | Kono | H04L 12/4641 370/395.53 |
| 2010/0313242 A1 | 12/2010 | Sato | |
| 2015/0280992 A1* | 10/2015 | Wang | H04L 41/0886 370/254 |
| 2015/0319043 A1* | 11/2015 | Dibirdi | H04L 41/0806 370/254 |
| 2018/0123944 A1* | 5/2018 | Jeyasekaran | H04L 43/10 |

FOREIGN PATENT DOCUMENTS

| | | |
|---|---|---|
| JP | 2010283607 A | 12/2010 |
| WO | 2016160420 A1 | 10/2016 |

OTHER PUBLICATIONS

Foreign Communication From a Counterpart Application, Japanese Application No. 2018-059836, Japanese Office Action dated May 13, 2019, 5 pages.
Foreign Communication From a Counterpart Application, Japanese Application No. 2018-059836, English Translation of Japanese Office Action dated May 13, 2019, 5 pages.
Machine Translation and Abstract of Chinese Publication No. CN102984507, Mar. 20, 2013, 11 pages.
Foreign Communication From a Counterpart Application, Chinese Application No. 201710193791.8, Chinese Office Action dated Nov. 22, 2019, 8 pages.

* cited by examiner

Enabling DHCP snooping

NETWORK SERVICE CONFIGURATION METHOD AND NETWORK MANAGEMENT DEVICE

CROSS-REFERENCE TO RELATED APPLICATION

This application claims priority to Chinese Patent Application No. 201710193791.8 filed on Mar. 28, 2017, which is hereby incorporated by reference in its entirety.

TECHNICAL FIELD

This application relates to the field of communications technologies, and in particular, to a network service configuration method and a network management device.

BACKGROUND

In a network application, simplification of network device management is an important issue. In network management, when a terminal located in a network needs to access the Internet, an administrator needs to configure a corresponding parameter for a network port of each network device in the network such that access data of the terminal is sent to the Internet using the network device in the network. In a process of configuring the parameter for the network port, the administrator needs to first analyze network devices related when the terminal accesses the Internet, then analyze service configuration requirements of the related network devices, and finally configure the network devices one by one.

When configuring a parameter of a network service, the administrator needs to calculate configurations of the related network devices. This has a high requirement for a skill of the administrator.

SUMMARY

This application provides a network service configuration method and a network management device in order to implement semi-automatic configuration of a network service.

According to a first aspect, a network service configuration method is provided.

The method includes obtaining, by a network management device, a terminal access port and an access parameter that is configured for the terminal access port and that is of a network service, where the terminal access port is a port that is of a network device in a network and that is for connecting a terminal device, determining, by the network management device, a to-be-configured port according to the access parameter that is configured for the terminal access port and that is of the network service, where the to-be-configured port is a port that is on an associated path and that is associated with the access parameter that is configured for the terminal access port and that is of the network service, and the associated path is a path between the terminal access port and a core switch, generating, by the network management device, a configuration instruction of the to-be-configured port according to the to-be-configured port and the access parameter that is configured for the terminal access port and that is of the network service, and sending, by the network management device, the configuration instruction of the to-be-configured port to a to-be-configured network device, where the to-be-configured network device is a network device in which the to-be-configured port is located.

After determining the terminal access port, the network management device may determine the to-be-configured port on the path between the terminal access port and the core switch according to the access parameter that is configured for the terminal access port and that is of the network service, then automatically generate the configuration instruction of the to-be-configured port according to the to-be-configured port and the access parameter that is configured for the terminal access port and that is of the network service, and send the configuration instruction of the to-be-configured port to the to-be-configured network device, thereby completing parameter configuration of the network service without requiring intervention from an administrator in order to lower a skill requirement for the administrator to perform parameter configuration management on the network service and an error probability of network operation and maintenance.

With reference to the first aspect, in a first possible implementation of the first aspect, the access parameter that is configured for the terminal access port and that is of the network service is a virtual local area network (VLAN) identifier (ID), and the to-be-configured port includes all ports, other than the terminal access port, on the associated path, and generating, by the network management device, a configuration instruction of the to-be-configured port according to the to-be-configured port and the access parameter that is configured for the terminal access port and that is of the network service includes generating a configuration instruction that is used to instruct the network device in which the to-be-configured port is located to create the VLAN ID and that is used to instruct to add the to-be-configured port to the VLAN ID when the VLAN ID does not exist in the network device in which the to-be-configured port is located, or generating a configuration instruction that is used to instruct to add the to-be-configured port to the VLAN ID when the VLAN ID exists in the network device in which the to-be-configured port is located.

The network management device generates, using a preset command that is executed by a to-be-configured port for a VLAN service, a command for allowing the VLAN service by the to-be-configured port, thereby automatically configuring the VLAN service without requiring manual intervention in order to improve efficiency of configuring the network service.

With reference to the first aspect, in a second possible implementation of the first aspect, the access parameter that is configured for the terminal access port and that is of the network service is enabling Dynamic Host Configuration Protocol (DHCP) snooping, and the to-be-configured port is a port that is for connecting another network device on the associated path and that is of a network device in which the terminal access port is located, and generating, by the network management device, a configuration instruction of the to-be-configured port according to the to-be-configured port and the access parameter that is configured for the terminal access port and that is of the network service includes generating, by the network management device, a configuration instruction that is used to instruct the port that is for connecting the other network device on the associated path and that is of the network device in which the terminal access port is located to be configured as a DHCP snooping trusted port.

The network management device generates, using a preset command that is executed by a to-be-configured port for a DHCP monitoring service, a command for enabling DHCP monitoring by a first port and trusting DHCP monitoring by the terminal access port, thereby automatically configuring the DHCP monitoring service without requiring manual intervention in order to improve efficiency of configuring the network service.

According to a second aspect, a network management device is provided, where the network management device includes a module for executing the method in any one of the first aspect or the implementations of the first aspect.

According to a third aspect, a network management device is provided, including a transceiver and a processor, where the processor is configured to execute the method in any one of the first aspect or the implementations of the first aspect.

According to a fourth aspect, a computer storage medium is provided, where the computer storage medium is configured to store a computer software instruction executed by the processor provided in the third aspect in order to execute the method provided in the first aspect or the possible implementations of the first aspect.

DESCRIPTION OF EMBODIMENTS

Figure 1:
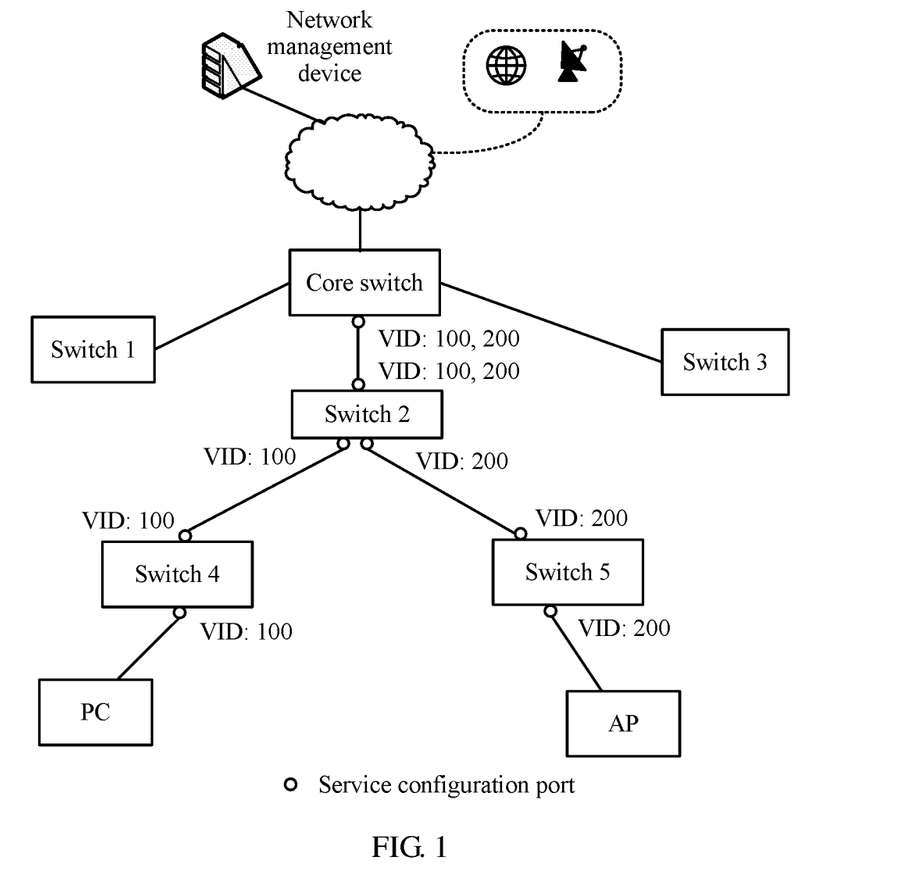
FIG. 1 is a schematic diagram of a system architecture according to this application.

In a network shown in FIG. 1, a core switch is separately connected to a switch 1, a switch 2, and a switch 3, the switch 2 is connected to a switch 4 and a switch 5, and a wireless access point (AP) is connected to the switch 5. A personal computer (PC) is connected to the switch 4. The PC needs to access the Internet, and according to an analysis made by an administrator, a parameter that needs to be configured for a network port through which access data of the PC passes is a VLAN ID 100 (designated as VID 100 in FIG. 1). In this case, the administrator determines that network devices that are between the PC and the Internet and that are passed through are the switch 4, the switch 2, and the core switch, then performs configuration to allow adding, to the VLAN 100, a network port that is of the switch 4 and that is for connecting a terminal and a network port that is of the switch 4 and that is for connecting the switch 2, performs configuration to allow adding, to the VLAN 100, a network port that is of the switch 2 and that is for connecting the switch 4 and a network port that is of the switch 2 and that is for connecting the core switch, and performs configuration to allow adding, to the VLAN 100, a network port that is of the core switch and that is for connecting the switch 2, thereby completing parameter configuration. Accordingly, some network ports of the switch 5, the switch 2, and the core switch are configured for allowing to be added to a VLAN 200 (designated as VID 200 in FIG. 1).

However, when configuring a parameter of a network service, the administrator is required to calculate configuration of a related network device. This has a high requirement for a skill of the administrator and costs a lot of time.

Figure 2:
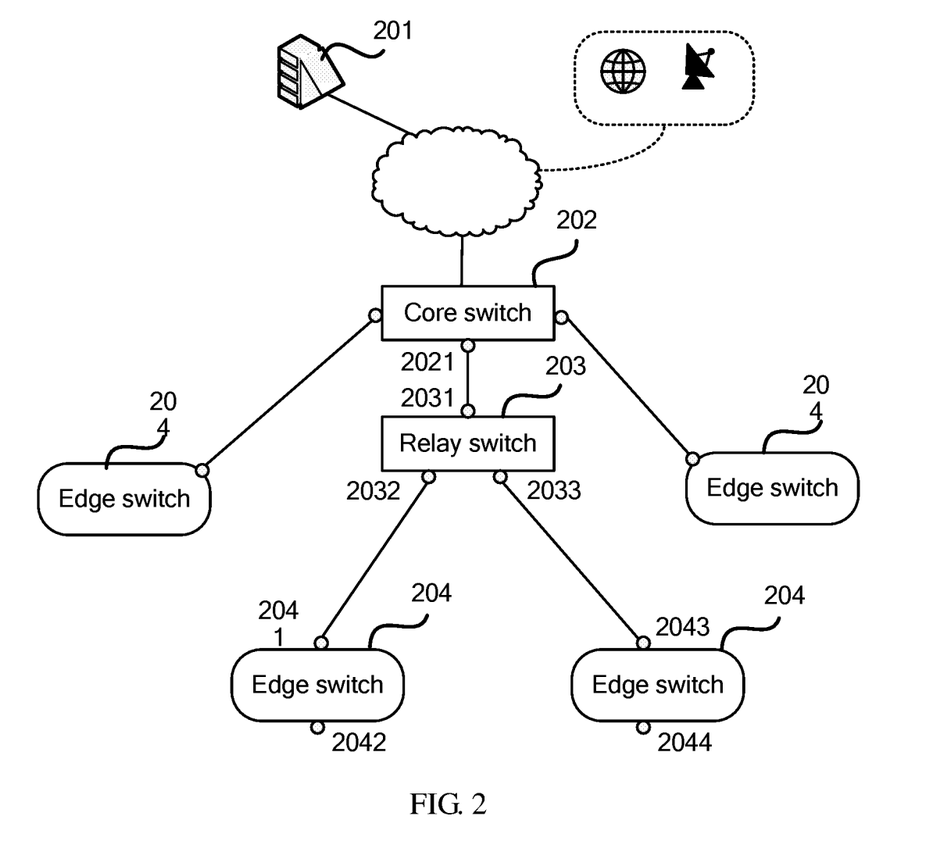
FIG. 2 is a schematic diagram of a system architecture according to this application.

Based on the foregoing description, FIG. 2 shows a system architecture applied to this application. Based on the system architecture, configuration of a network service can be controlled, and semi-automatic parameter configuration of the network service can be implemented. The system architecture that is provided in this application and that is for network service configuration includes a network management device 201 and three network devices, a core switch 202, a relay switch 203, and an edge switch 204. Each independent network includes only one core switch 202, multiple relay switches 203, and multiple edge switches 204. The core switch 202 may be connected to the edge switch 204 using the relay switch 203, or may be directly connected to the edge switch 204. For convenience of display, FIG. 2 shows an example of a network that includes only one relay switch 203. In an embodiment, the core switch 202 may be connected to the edge switch 204 after being connected to the multiple relay switches 203 by means of cascading.

The network management device 201 may be a network management server, and is configured to manage the network device in the network and send a control instruction to the network device managed by the network management device 201. The core switch 202 is generally a network device that is in the network and that can access the Internet. The edge switch 204 is generally a network device configured to connect a terminal. The terminal may be a terminal device, such as a PC or an AP, that connects the edge switch 204 in a wired manner. The relay switch 203 is a network device that is in the network and that is between the core switch 202 and the edge switch 204.

A port 2042 and a port 2044 shown in FIG. 2 are ports that are on the edge switch 204 and that can be connected to the terminal, and may be also referred to as terminal access ports in this application.

In this application, the network management device 201 may obtain network devices in the network, and may obtain a connection relationship between the network devices in the network.

Figure 3:
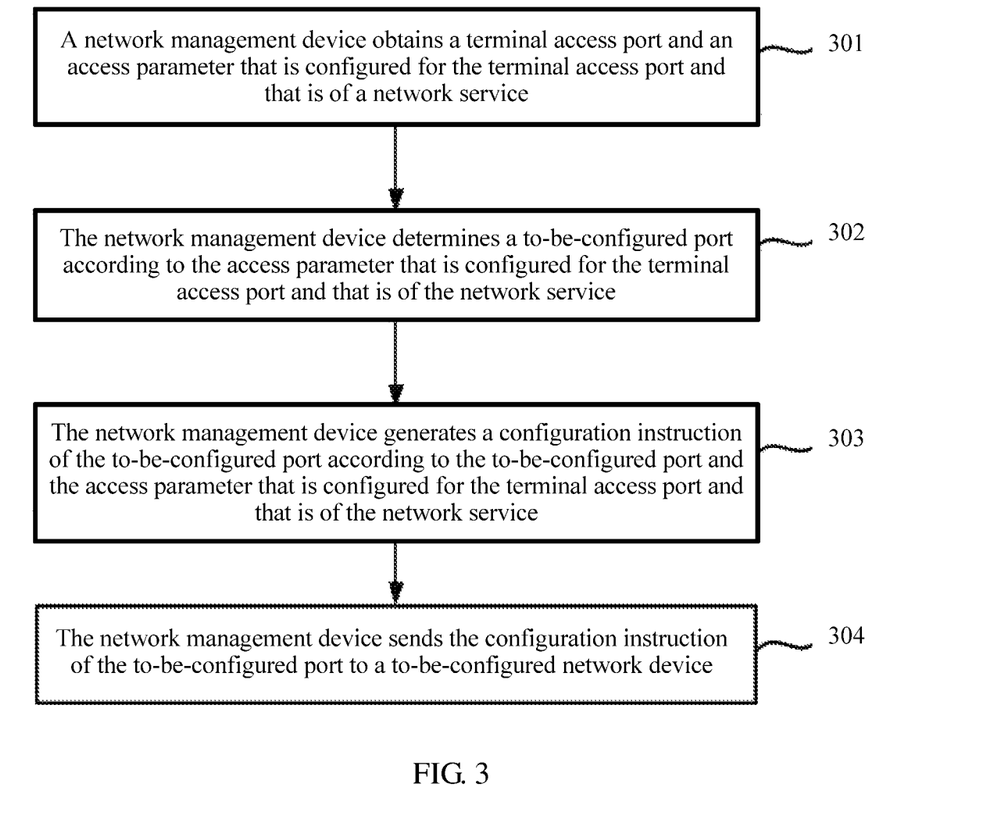
FIG. 3 is a schematic flowchart of a network service configuration method according to this application.

Based on the foregoing description, FIG. 3 shows an example of a procedure of a network service configuration method provided in this application. The procedure may be performed by a network management device.

As shown in FIG. 3, the procedure includes the following steps.

Step 301: The network management device obtains a terminal access port and an access parameter that is configured for the terminal access port and that is of a network service.

The terminal access port is a port that is on an edge switch in a network and that is for connecting a terminal, and the terminal may be connected to the port in a wired manner in order to use a network resource. After the terminal is connected to the terminal access port, a user who uses the terminal informs an administrator of the terminal access port connected to the terminal, for example, the port 2042 on the edge switch 204 in FIG. 2. After obtaining the terminal access port, the administrator manually configures, for the terminal access port, the access parameter of the network service. Then the administrator may configure, on a user management interface of the network management device, the terminal access port as the port 2042, and the access parameter that is configured for the terminal access port and that is of the network service such that the network management device can obtain the terminal access port and the access parameter that is configured for the terminal access port and that is of the network service.

When the administrator manually configures, for the terminal access port, the access parameter of the network service, if the terminal is a PC, and the PC needs to access the Internet, the access parameter that is of the network service and that is configured by the administrator for the terminal access port is a VLAN ID. The terminal access port needs to be configured for allowing to be added to the VLAN ID. If the terminal is an AP, a corresponding access parameter that is configured for the terminal access port and that is of the network service is enabling DHCP snooping. A type of the foregoing access parameter that is configured for the terminal access port and that is of the network service is used only as an example, and this application imposes no limitation thereon.

Step 302: The network management device determines a to-be-configured port according to the access parameter that is configured for the terminal access port and that is of the network service.

The to-be-configured port is a port that is on an associated path and that is associated with the terminal access port and the access parameter that is configured for the terminal access port and that is of the network service. The associated path is a path between the terminal access port and a core switch. After determining the terminal access port, the network management device needs to determine the associated path according to the terminal access port. Because the network management device may learn a connection relationship between network devices, the network management device may determine the path between the terminal access port and the core switch using the terminal access port as a start point and using the core switch as an end point. For example, in FIG. 2, when learning that the terminal access port is the port 2042, the network management device 201 uses the port 2042 as the start point to search in a direction of approaching the core switch 202, and may obtain the associated path that is represented as the port 2042→a port 2041→a port 2032→a port 2031→a port 2021 using port numbers of the network devices. If the terminal access port is the port 2044, the network management device 201 may determine the associated path as the port 2044→a port 2043→a port 2033→the port 2031→the port 2021.

The network management device 201 may obtain the to-be-configured port according to the associated path. The to-be-configured port may be one or more of all ports on the associated path. Which port or ports on the associated path are to-be-configured ports is determined by the access parameter that is configured for the terminal access port and that is of the network service. For example, when the access parameter that is configured for the terminal access port and that is of the network service is the VLAN ID, the to-be-configured port includes all ports, other than the terminal access port, on the associated path. As shown in FIG. 2, when the terminal access port is the port 2042, the to-be-configured ports are the port 2041, the port 2032, the port 2031, and the port 2021. When the terminal access port is the port 2044, the to-be-configured ports are the port 2043, the port 2033, the port 2031, and the port 2021.

When the access parameter that is configured for the terminal access port and that is of the network service is enabling DHCP snooping, the to-be-configured port is a port that is for connecting another network device on the associated path and that is of a network device in which the terminal access port is located. As shown in FIG. 2, when the terminal access port is the port 2042, a port that is for connecting the relay switch 203 on the associated path and that is of the edge switch 204 in which the terminal access port is located is the port 2041, and the to-be-configured port is the port 2041. Accordingly, when the terminal access port is the port 2044, the to-be-configured port is the port 2043.

Step 303: The network management device generates a configuration instruction of the to-be-configured port according to the to-be-configured port and the access parameter that is configured for the terminal access port and that is of the network service.

Because an execution instruction needs to be configured for each to-be-configured port, different access parameters of the network service are configured for different terminal access ports, and different instructions are configured for to-be-configured ports corresponding to the terminal access ports. Details are described below.

After determining that the access parameter that is configured for the terminal access port and that is of the network service is the VLAN ID and determining that the to-be-configured port includes all the ports, other than the terminal access port, on the associated path, the network management device needs to determine whether the VLAN ID exists in a network device in which the to-be-configured port is located. When determining that the VLAN ID does not exist in the network device in which the to-be-configured port is located, the network management device generates a configuration instruction that is used to instruct the network device in which the to-be-configured port is located to create the VLAN ID and that is used to instruct to add the to-be-configured port to the VLAN ID. When determining that the VLAN ID exists in the network device in which the to-be-configured port is located, the network management device generates a configuration instruction that is used to instruct to add the to-be-configured port to the VLAN ID.

Figure 4:
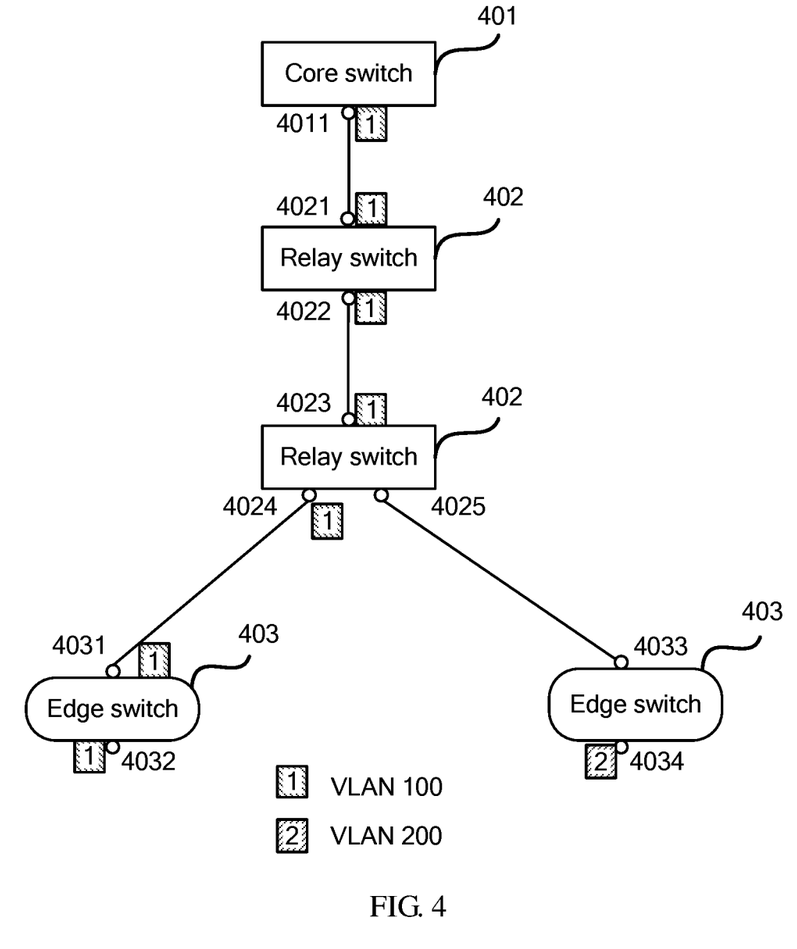
FIG. 4 is a schematic diagram of a network topology according to this application.
Figure 5:
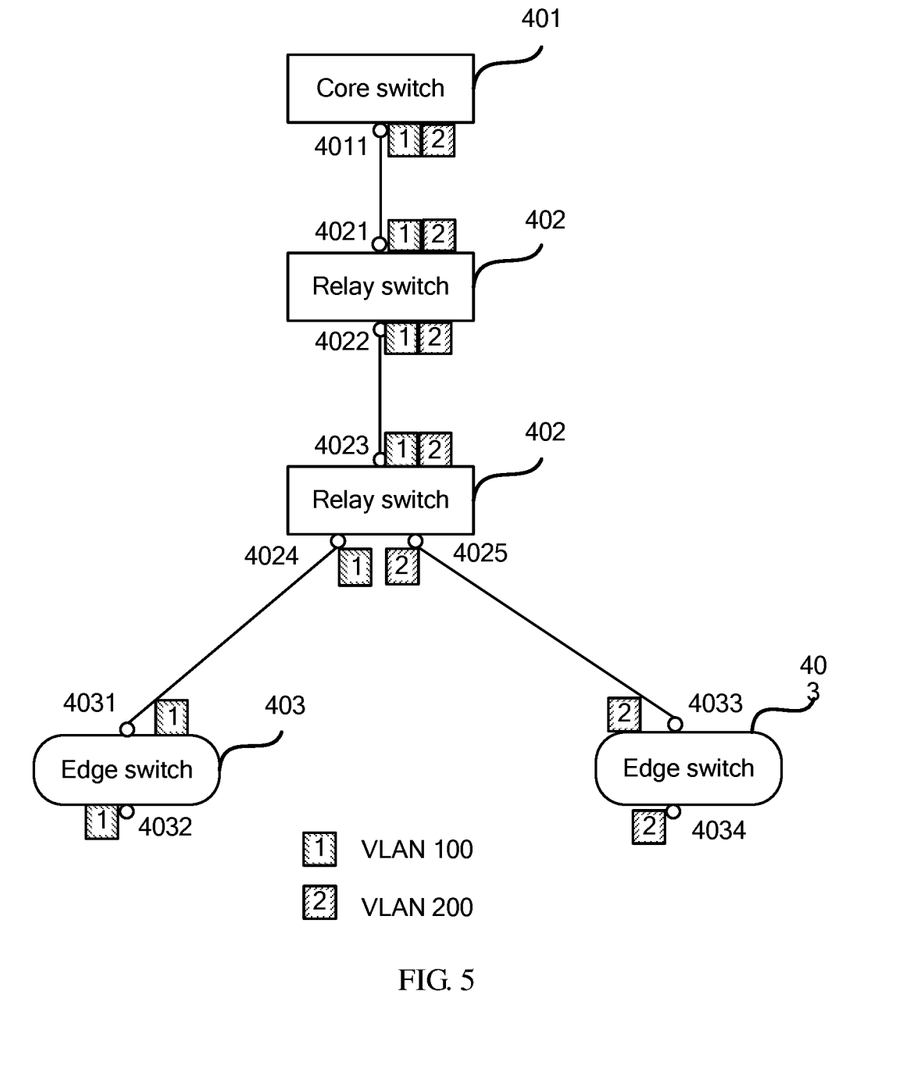
FIG. 5 is a schematic diagram of a network topology according to this application.

For example, as shown in FIG. 4, the network management device has configured a parameter VLAN 100 of a network service for all ports, that is, a port 4031, a port 4024, a port 4023, a port 4022, a port 4021, and a port 4011, on an associated path that uses a terminal access port 4032 as a start point, and has configured, for a terminal access port 4034, an access parameter VLAN 200 of the network service. That is, an administrator determines to newly configure the VLAN 200 for the port 4034, and the network management device may learn that an access parameter that is configured for the terminal access port 4034 and that is of the network service is the VLAN 200, and need to configure the parameter VLAN 200 of the network service for each port on an associated path that uses the terminal access port 4034 as a start point. In a network topology shown in FIG. 4, it may be determined that to-be-configured ports are a port 4033, a port 4025, the port 4023, the port 4022, the port 4021, and the port 4011. In this case, the network management device may determine that the VLAN 200 exists in an edge switch 403, and therefore, may generate a configuration instruction that is used to instruct to add the port 4033 to the VLAN 200. However, the VLAN 200 does not exist in a relay switch 402 or a core switch 401. In this case, the network management device needs to generate a configuration instruction that is used to instruct the relay switch 402 in which the port 4023 and the port 4025 are located to create the VLAN 200, and a configuration instruction that is used to instruct to add the port 4023 and the port 4025 to the VLAN 200, needs to generate a configuration instruction that is used to instruct the relay switch 402 in which the port 4021 and the port 4022 are located to create the VLAN 200, and a configuration instruction that is used to instruct to add the port 4021 and the port 4022 to the VLAN 200, and needs to generate a configuration instruction that is used to instruct the core switch 401 in which the port 4011 is located to create the VLAN 200, and a configuration instruction that is used to instruct to add the port 4011 to the VLAN 200. A configured network topology is shown in FIG. 5.

Optionally, after the network management device determines that the access parameter that is configured for the terminal access port and that is of the network service is enabling DHCP snooping and determines that the to-be-configured port is the port that is for connecting another network device on the associated path and that is of the network device in which the terminal access port is located, the network management device may generate a configuration instruction that is used to instruct the port that is for connecting the other network device on the associated path and that is of the network device in which the terminal access port is located to be configured as a DHCP snooping trusted port.

Figure 6:
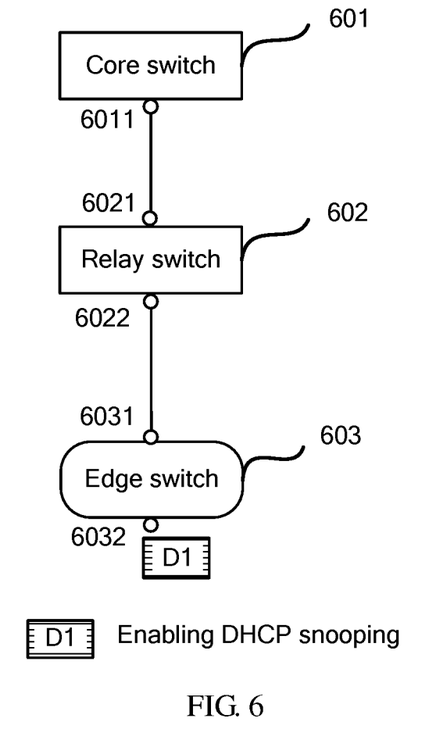
FIG. 6 is a schematic diagram of a network topology according to this application.
Figure 7:
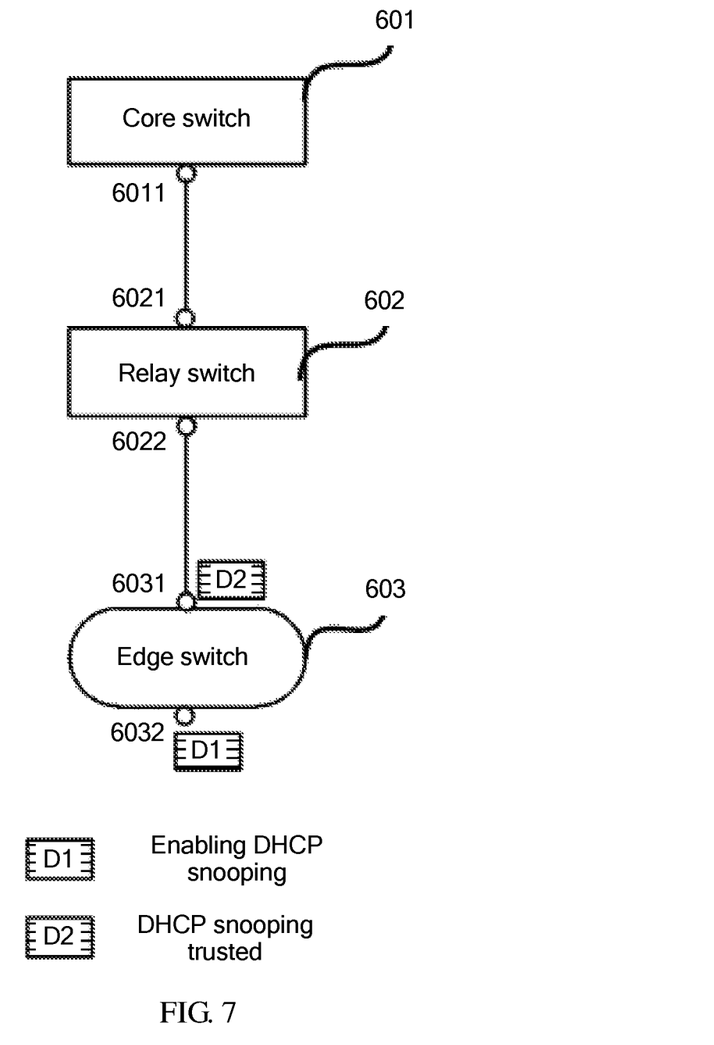
FIG. 7 is a schematic diagram of a network topology according to this application.

For example, in a network shown in FIG. 6, the network includes a core switch 601, a relay switch 602, and an edge switch 603. Ports on an associated path include a port 6032, a port 6031, a port 6022, a port 6021, and a port 6011. An administrator configures, for the terminal access port 6032, an access parameter of a network service as enabling DHCP snooping, that is, the DHCP snooping is enabled for the terminal access port. The network management device may learn that the access parameter that is configured for the terminal access port 6032 and that is of the network service is enabling DHCP snooping in order to generate a configuration instruction that is used to instruct the to-be-configured port 6031 to be configured as the DHCP snooping trusted port. For example, a configuration instruction of the port 6031 in the edge switch 603 is DHCP snooping trusted. A configured network topology is shown in FIG. 7.

It should be noted that, for convenience of description, the foregoing example only shows a relatively simple topology environment. In actual application, the method may be applied to a network with more network devices and more complex networking.

The foregoing configuration instruction may be preset by the administrator. A correspondence between the configuration instruction and the access parameter that is configured for the terminal access port and that is of the network service is preset by the administrator, is then stored in the network management device, and is called by the network management device.

Step 304: The network management device sends the configuration instruction of the to-be-configured port to a to-be-configured network device.

After generating a configuration instruction of each to-be-configured port, the network management device sends the generated configuration instruction of the to-be-configured port to the to-be-configured network device on the associated path in order to complete network service configuration, where the to-be-configured network device is a network device in which the to-be-configured port is located.

It may be learned from the foregoing embodiment that, after determining the terminal access port, the network management device may determine the to-be-configured port on the path between the terminal access port and the core switch according to the access parameter that is configured for the terminal access port and that is of the network service, then automatically generate the configuration instruction of the to-be-configured port according to the to-be-configured port and the access parameter that is configured for the terminal access port and that is of the network service, and send the configuration instruction of the to-be-configured port to the to-be-configured network device, thereby completing parameter configuration of the network service. In this process, intervention from the administrator is not required, a skill requirement for the administrator to perform parameter configuration management on the network service is lowered, an error probability of network operation and maintenance may be reduced, efficiency of configuring the network service is improved, and a lot of time of the administrator is saved.

Figure 8:
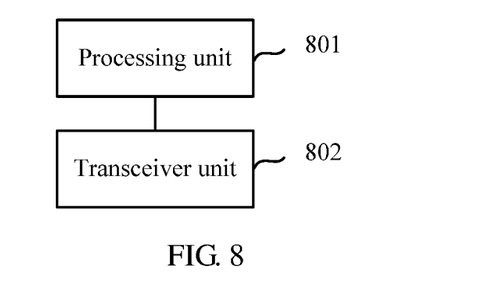
FIG. 8 is a schematic structural diagram of a network management device according to this application.

FIG. 8 shows a network management device according to this application. The network management device may perform a procedure of network service configuration.

As shown in FIG. 8, the network management device includes a processing unit 801 and a transceiver unit 802.

The transceiver unit 802 is configured to obtain a terminal access port and an access parameter that is configured for the terminal access port and that is of a network service, where the terminal access port is a port that is of a network device in a network and that is for connecting a terminal device.

The processing unit 801 is configured to determine a to-be-configured port according to the access parameter that is obtained by the transceiver unit 802, that is configured for the terminal access port, and that is of the network service, where the to-be-configured port is a port that is on an associated path and that is associated with the access parameter that is configured for the terminal access port and that is of the network service, and the associated path is a path between the terminal access port and a core switch, and generate a configuration instruction of the to-be-configured port according to the to-be-configured port and the access parameter that is configured for the terminal access port and that is of the network service.

The transceiver unit 802 is further configured to send the configuration instruction of the to-be-configured port to a to-be-configured network device, where the to-be-configured network device is a network device in which the to-be-configured port is located.

Specific procedures that are performed by the processing unit 801 and the transceiver unit 802 are described in detail in the foregoing embodiments, and details are not described again.

Figure 9:
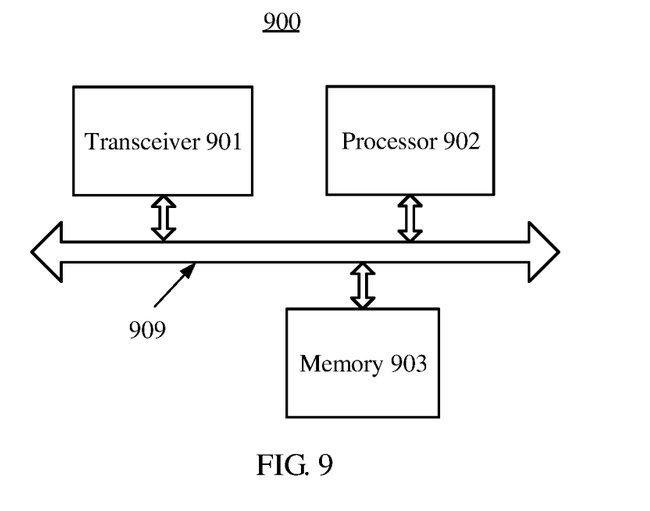
FIG. 9 is a schematic structural diagram of a network management device according to this application.

Based on a same conception, referring to FIG. 9, FIG. 9 shows a network management device 900 according to this application. The network management device 900 may perform steps or functions that are performed by the network management device in the foregoing embodiments. The network management device 900 may include a transceiver 901, a processor 902, and a memory 903. The processor 902 is configured to control an operation of the network management device 900. The memory 903 may include a read-only memory (ROM) and a random access memory (RAM), and store an instruction and data that can be executed by the processor 902. Components such as the transceiver 901, the processor 902, and the memory 903 are connected using a bus 909.

The network service configuration method disclosed in this application may be applied to the processor 902, or may be implemented by the processor 902.

The processor 902 is configured to read code in the memory 903 in order to execute a procedure of network service configuration.

All or some of the foregoing embodiments may be implemented by means of software, hardware, or any combination thereof. When software is used to implement the embodiments, the embodiments may be implemented completely or partially in a form of a computer program product.

The computer program product includes one or more computer instructions. When the computer program instructions are loaded and executed on a computer, the procedure or functions according to the embodiments of the present disclosure are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, a twisted pair, an optical fiber) or wireless (for example, infrared, radio, and microwave, or the like) manner. The computer-readable storage medium may be any available medium accessible by a computer, or a data storage device, such as a server or a data center, integrating one or more available media. The available medium may be a magnetic medium (for example, a floppy disk, a hard disk, or a magnetic tape), an optical medium (for example, an optical disc), a semiconductor medium (for example, a solid state disk (SSD)), or the like.

Obviously, a person skilled in the art can make various modifications and variations to this application without departing from the scope of this application. This application is intended to cover these modifications and variations provided that they fall within the scope of protection defined by the following claims.

What is claimed is:

1. A network service configuration method, comprising:
   obtaining, by a network management device, a terminal access port and an access parameter of a network service, wherein the access parameter is configured for the terminal access port, wherein the terminal access port is a port of a network device in a network, and wherein the terminal access port is configured to couple to a terminal device;
   determining, by the network management device, to-be-configured ports according to the access parameter, wherein the to-be-configured ports comprise ports coupled to a path between the terminal access port and a core switch that is associated with the access parameter;
   generating, by the network management device, to-be-configured port configuration instructions according to the to-be-configured ports and the access parameter, wherein the network management device automatically generates the to-be-configured port configuration instructions without manual intervention by an administrator, wherein one of the to-be-configured ports comprises a port on the path other than the terminal access port, and wherein generating the to-be-configured port configuration instructions comprises:
      generating the to-be-configured port configuration instructions to instruct at least one of the network devices to create a virtual local area network (VLAN) identifier (ID) and add one of the to-be-configured ports to the VLAN ID when the VLAN ID does not exist in the network device in which the one of the to-be-configured ports is located; and
      generating the to-be-configured port configuration instructions to instruct the at least one of the network devices to add the one of the to-be-configured ports to the VLAN ID when the VLAN ID exists in the network device in which the one of the to-be-configured ports is located;
   sending, by the network management device, the to-be-configured port configuration instructions to to-be-configured network devices, wherein the to-be-configured network devices comprise all network devices in the path between the terminal access port and the core switch, and wherein all network devices comprise the core switch, an edge switch, and at least one relay switch between the core switch and the edge switch; and
   associating, by the network management device, the core switch, the edge switch, and the at least one relay switch with the access parameter, wherein the access parameter comprises the VLAN ID.

2. The network service configuration method of claim 1, wherein the at least one relay switch between the core switch and the edge switch comprises two or more relay switches between the core switch and the edge switch.

3. The network service configuration method of claim 1, wherein the network management device, the core switch, the at least one relay switch, and the edge switch comprise separate network components of the network and are communicatively coupled together.

4. The network service configuration method of claim 1, wherein the edge switch is configured to communicate with either a personal computer or an access point.

5. The network service configuration method of claim 4, wherein the network management device determines a path between the personal computer or the access point using port numbers of the core switch, the edge switch, and the at least one relay switch.

6. The network service configuration method of claim 1, wherein the at least one relay switch between the core switch and the edge switch comprises a first relay switch and a second relay switch, wherein the VLAN ID does not exist on the first relay switch, and wherein the VLAN ID exists on the second relay switch.

7. The network service configuration method of claim 6, wherein generating the to-be-configured port configuration instructions comprises generating the to-be-configured port configuration instructions to instruct the first relay switch to create the VLAN ID and add a port of the first relay switch to the VLAN ID.

8. The network service configuration method of claim 7, wherein generating the to-be-configured port configuration instructions comprises generating the to-be-configured port configuration instructions to instruct the second relay switch to add a port of the second relay switch to the VLAN ID.

9. A network management device, comprising:
   a transceiver; and
   a processor coupled to the transceiver and configured to:
      obtain, using the transceiver, a terminal access port and an access parameter of a network service, wherein the access parameter is configured for the terminal access port, wherein the terminal access port is a port of a network device in a network, and wherein the terminal access port is configured to couple a terminal device;
      determine to-be-configured ports according to the access parameter, wherein the to-be-configured ports comprise a port coupled to a path between the terminal access port and a core switch that is associated with the access parameter;
      generate to-be-configured port configuration instructions according to the to-be-configured ports and the access parameter, wherein the network management device automatically generates the to-be-configured port configuration instructions without manual intervention by an administrator, wherein one of the to-be-configured ports comprises a port on the path other than the terminal access port, and wherein the processor is further configured to:

generate the to-be-configured port configuration instructions to instruct at least one of the network devices to create a virtual local area network (VLAN) identifier (ID) and add the one of the to-be-configured ports to the VLAN ID when the VLAN ID does not exist in the network device in which the to-be-configured ports are located; and generate the to-be-configured port configuration instructions to instruct the at least one of the network devices to add the one of the to-be-configured ports to the VLAN ID when the VLAN ID exists in the network device in which the one of the to-be-configured ports is located;

send, to to-be-configured network devices using the transceiver, the to-be-configured port configuration instructions that are generated by the processor, wherein the to-be-configured network devices comprise all network devices in the path between the terminal access port and the core switch, and wherein all network devices comprise the core switch, an edge switch, and at least one relay switch between the core switch and the edge switch; and associate the core switch, the edge switch, and the at least one relay switch with the access parameter, wherein the access parameter comprises the VLAN ID.

10. The network management device of claim 9, wherein the at least one relay switch between the core switch and the edge switch comprises two or more relay switches between the core switch and the edge switch.

11. The network management device of claim 9, wherein the network management device, the core switch, the at least one relay switch, and the edge switch comprise separate network components of the network and are communicatively coupled together.

12. The network management device of claim 9, wherein the edge switch is configured to communicate with either a personal computer or an access point.

13. The network management device of claim 12, wherein the network management device determines a path between the personal computer or the access point using port numbers of the core switch, the edge switch, and the at least one relay switch.

14. The network management device of claim 9, wherein the at least one relay switch between the core switch and the edge switch comprises a first relay switch and a second relay switch, wherein the VLAN ID does not exist on the first relay switch, and wherein the VLAN ID exists on the second relay switch.

15. The network management device of claim 14, wherein the processor is configured to generate the to-be-configured port configuration instructions by generating the to-be-configured port configuration instructions to instruct the first relay switch to create the VLAN ID and add a port of the first relay switch to the VLAN ID.

16. The network management device of claim 15, wherein the processor is configured to generate the to-be-configured port configuration instructions by generating the to-be-configured port configuration instructions to instruct the second relay switch to add a port of the second relay switch to the VLAN ID.

17. A computer program product comprising a non-transitory computer readable storage medium storing program code thereon for network service configuration, wherein the program code comprises instructions for executing a method that comprises:

obtaining, by a network management device, a terminal access port and an access parameter of a network service, wherein the access parameter is configured for the terminal access port, wherein the terminal access port is a port of a network device in a network, and wherein the terminal access port is configured to couple to a terminal device;

determining, by the network management device, to-be-configured ports according to the access parameter, wherein the to-be-configured ports comprise ports coupled to a path between the terminal access port and a core switch that is associated with the access parameter;

generating, by the network management device, to-be-configured port configuration instructions according to the to-be-configured ports and the access parameter, wherein the network management device automatically generates the to-be-configured port configuration instructions without manual intervention by an administrator, wherein one of the to-be-configured ports comprises a port on the path other than the terminal access port, and wherein generating the to-be-configured port configuration instructions comprises:

generating the to-be-configured port configuration instructions to instruct at least one of the network devices-to create a virtual local area network (VLAN) identifier (ID) and add one of the to-be-configured ports to the VLAN ID when the VLAN ID does not exist in the network device in which the one of the to-be-configured ports is located; and generating the to-be-configured port configuration instructions to instruct the at least one of the network devices to add the one of the to-be-configured ports to the VLAN ID when the VLAN ID exists in the network device in which the one of the to-be-configured ports is located;

sending, by the network management device, the to-be-configured port configuration instructions to to-be-configured network devices, wherein the to-be-configured network devices comprise all network devices in the path between the terminal access port and the core switch, and wherein all network devices comprise the core switch, an edge switch, and at least one relay switch between the core switch and the edge switch; and associating, by the network management device, the core switch, the edge switch, and the at least one relay switch with the access parameter, wherein the access parameter comprises the VLAN ID.

18. The computer program product of claim 17, wherein the edge switch is configured to communicate with either a personal computer or an access point, and wherein the network management device determines a path between the personal computer or the access point using port numbers of the core switch, the edge switch, and the at least one relay switch.

19. The computer program product of claim 17, wherein the at least one relay switch between the core switch and the edge switch comprises a first relay switch and a second relay switch, wherein the VLAN ID does not exist on the first relay switch, and wherein the VLAN ID exists on the second relay switch.

20. The computer program product of claim 19, wherein the to-be-configured port configuration instructions instruct the first relay switch to create the VLAN ID and add a port of the first relay switch to the VLAN ID and instruct the second relay switch to add a port of the second relay switch to the VLAN ID.

\* \* \* \* \*